June 26, 1962 E. J. HERBENAR 3,041,094
JOINT ASSEMBLY
Filed Aug. 5, 1958
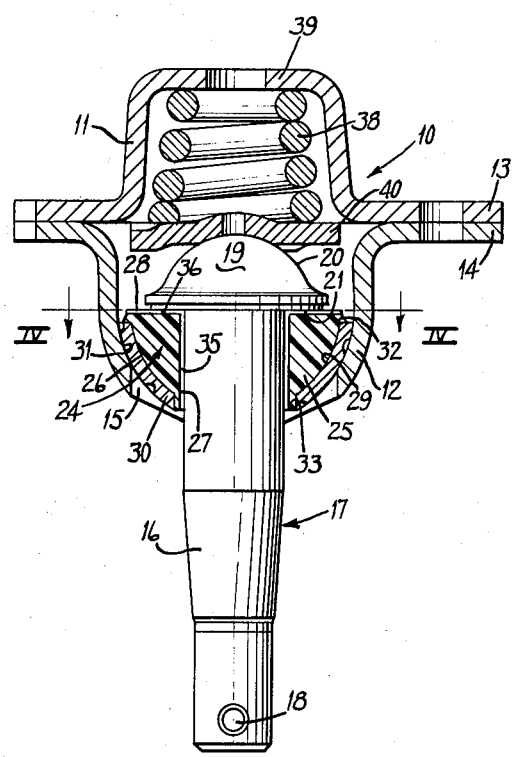
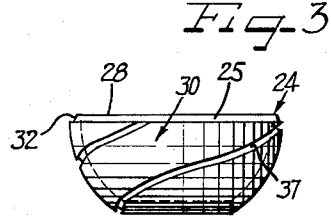
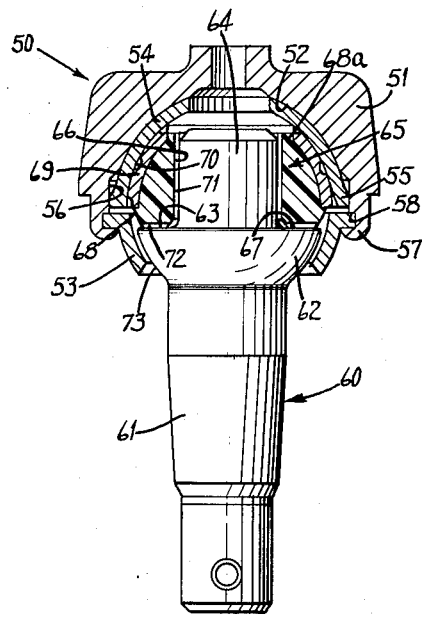
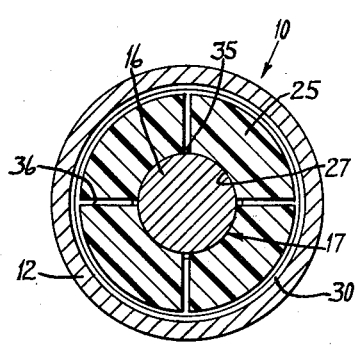
Inventor
Edward J. Herbenar
by Hill, Sherman, Meroni, Gross & Simpson Attys

United States Patent Office 3,041,094
Patented June 26, 1962

3,041,094
JOINT ASSEMBLY
Edward J. Herbenar, Detroit, Mich., assignor to Thompson Ramo Wooldridge Inc., a corporation of Ohio
Filed Aug. 5, 1958, Ser. No. 753,265
1 Claim. (Cl. 287—87)

This invention relates to joint assemblies with metal-clad plastic bearings, and more specifically, deals with ball stud-type joints having studs rotatable in metal-clad plastic bearings which are tiltable on the wall of a housing for the joint.

The invention will hereinafter be specifically described as embodied in compression loaded and tension loaded ball joints for steering linkages and wheel suspensions of automotive vehicles, but it should be understood that the principles of this invention are generally applicable to joint and bearing assemblies having one member in bearing relation with a non-metallic bearing assembly which, in turn, is in metal-to-metal bearing relationship with another bearing surface.

The ball joints of this invention have a metal stud with a cylindrical shank rotatably mounted in the bore of a plastic semi-ball or toroidal member that is covered with a metal cap which tilts on a fragmental spherical or toroidal metal bearing wall of a housing. The stud has a shoulder in thrust bearing relation with a plastic end face of the ball member, and the shank of the stud extends through an opening in the housing. The cap of the ball prevents the plastic from flowing into this housing opening.

The preferred plastic for the metal-clad bearing unit of this invention is nylon, but other synthetic resins such as amino resins, polytetrafluoro-ethylene (Teflon) and the like are useful. The plastic should be sturdy, durable, self-lubricating, and not softened or expanded by lubricants. In general, polyamide synthetic resins are desirable.

The metal cover or cap for the plastic bearing is preferably composed of steel which is case-hardened to a desirable bearing hardness on its outer surface for riding on a metal bearing wall. The cover or cap can be stamped from sheet steel such as S.A.E. 1010 or 1020, or the like.

The stud member of the joints of this invention is rotatable in the plastic bearing member, and since self-lubricating plastic such as nylon is scuff resisting and reduces wear on a metal part in bearing relation therewith, the studs of this invention can be inexpensively made from rod steel stock by upsetting operations. The heat treatment of the upset studs can be greatly simplified and relatively soft-finished studs will have ample wear resistance. Heretofore required induction hardening, machine finishing, and the like treatment of studs is avoided.

The joints of this invention can have the metal covers or caps for the bearing members equipped with grease distributing grooves for lubricating the metal-to-metal bearing surfaces, and the plastic bearing member can be equipped with grease distributing grooves to lubricate the metal-to-plastic bearing surfaces. The grooves in the metal cap or cover can be formed on the part while it is in the flat sheet metal stage or after the cap shape is formed.

An important feature of the invention is the reduction in cost of the assembly brought about by the elimination of heretofore required expensive metals and heat treatments and elimination of heretofore required machining operations.

Another important feature of the invention is the insulation of the stud of the joints of this invention from the joint housing through a sound-deadening and vibration-absorbing non-metal plastic bearing.

Another important feature of this invention is the elimination of objectionable cold flow of plastic bearings by covering the plastic bearing with a metal cap which will resist deformation of relatively moveable bearing surfaces such as might occur if the plastic were directly seated on the metal bearing wall of the housing.

It is then an important object of this invention to provide a joint assembly having a metal-clad plastic bearing.

Another object of this invention is to provide a joint assembly of the ball and socket type having one pair of metal-to-metal bearing surfaces and a second pair of metal-to-plastic bearing surfaces.

Another object of the invention is to provide a ball and socket type joint especially useful for wheel suspensions and automotive steering linkages wherein the stud member of the joint is rotatably mounted in a self-lubricating plastic bearing, which bearing, in turn, is tiltable in the housing of the joint.

A still further object of this invention is to provide a ball-type joint with an inexpensive ball stud rotatably mounted in a self-lubricating plastic bearing which is encased in a metal cover that is tiltable on the internal bearing wall of a housing assembly.

A specific object of this invention is to provide a silently operating ball and socket joint having a steel-clad nylon bearing.

A still further specific object of this invention is to provide a metal-clad plastic bearing unit for ball-type joints which has grease distributing grooves in the outer face of the metal cover and grease distributing grooves on one end face and through the bore of the bearing ring.

Other and further objects of this invention will be apparent to those skilled in this art from the following detailed description of the annexed sheet of drawings, which, by way of preferred examples, illustrates two embodiments of the invention.

On the drawings:

FIG. 1 is a vertical cross-sectional view, with parts in elevation, of a tension-loaded type of ball and socket joint according to this invention;

FIG. 2 is a view similar to FIG. 1 but illustrating a compression-loaded type of ball and socket joint according to this invention;

FIG. 3 is a side elevational view of the metal-clad plastic bearing unit for the joints of this invention; and FIG. 4 is a horizontal cross-sectional view taken generally along the line IV—IV of FIG. 1.

As shown on the drawings:

The tension-loaded type ball and socket joint 10 of FIGS. 1 and 4 includes a two-piece housing, a stud, a metal-clad plastic bearing unit, a spring plate, and a coil spring for urging the plate against the head of the stud. The housing has an inverted cup-shaped top or cover 11 and a main stamped metal cup-shaped body 12. An out-turned flange 13 on the cover 11 mates with an out-turned flange 14 on the main body 12, and the two flanges may be secured together in any suitable way. In wheel suspension assemblies the flange 14 may rest on the wall of a wheel arm or the like with the cup portion of the housing 12 extending through an aperture of the arm.

The housing 12 is apertured as at 15 to freely receive therethrough the shank 16 of a ball stud 17. The stud shank 16 has a main cylindrical portion, a tapered portion and a reduced cylindrical end 18 to receive a fastening means or the like for securing the stud to the steering knuckle of a wheel suspension or to a connecting rod or tie rod of a steering linkage (not shown).

The stud 17 has an enlarged domed head 19 on the end thereof remote from the end 18, and this head 19 provides a convex spherical surface 20 and a flat shoulder or clutch face 21 extending radially outward from the cylindrical portion of the shank.

A metal-clad nylon bearing ring 24 of generally hemispherical shape is interposed between the stud and housing to rotatably support the stud in the nylon portion thereof and to tiltably support the stud on the metal cover thereof. The bearing 24 includes a molded nylon main body 25 and a stamped steel cover or cap 30. The unit 24 has a substantially toroidal outer bearing wall 26 for riding on the complementary shaped inner bearing wall 31 of the housing 12, a straight cylindrical bore 27 for providing a radial bearing for the cylindrical portion of the stud shank 16, and a flat annular end face 28 for coacting with the shoulder or clutch face 21 of the stud head.

The cap or cover 30 is bottomed on the nylon body 25 by an annular lip 32 on the nylon which overlies the end of the cup and by a ring flange 33 which extends through the aperture in the cup. The lip 32 and the flange 33 snugly embrace the opposite end edges of the metal cup to maintain the cup in fixed relation on the nylon. The nylon body 25 is preferably equipped with axially extending grooves 35 at spaced intervals around the bore 27 thereof and these grooves mate with grooves 36 in the clutch face 28 thereof. The grooves 35 and 36 serve to distribute lubricant from the interior of the housing 12 to the metal-to-plastic bearing surfaces of the stud and nylon body.

The metal cover or cap 30 for the nylon body 25 is also preferably equipped with grease grooves such as spiral grooves 37 in the outer surface thereof to distribute lubricant to the metal-to-metal bearing surfaces.

A coiled spring 38 is provided in the cover 11 and is bottomed on the end wall 39 of the cover to spring load a washer 40 in the housing 12. This washer 40 has a dished central portion fitting the convex wall 20 of the stud head 19. The end wall 39 of the cover 11 is apertured to receive a grease fitting (not shown) or plug so that the housing can be packed with lubricant. The washer 40 preferably has a central aperture through the center thereof to distribute lubricant to the spherical surface 20 of the stud head.

In operation of the joint assembly 10, the stud 17 is tension loaded and the metal-clad plastic bearing 24 tilts on the internal spherical bearing wall of the housing 12 while the stud itself is free to rotated in the bearing ring 24. The axial loads on the stud are borne by the end face 28 of the nylon and by the mating end wall or shoulder 21 of the stud head. Radial loads are borne by the axial bore wall of the nylon and by the cylindrical portion of the stud shank 16. Tilting loads are borne on the metal cover or cap 30 and on the metal bearing wall of the housing 12. The stud head is maintained against the nylon end wall 28 and the metal cover 30 is maintained on the bearing wall of the housing 12 by the spring-loaded washer 40. Tilting movements of the stud relative to the washer are freely accommodated by the spherical surface 20 of the stud head 19. In wheel suspensions, it is desirable that road noises be dampened out from the car body and the nylon has proved to be an effective muffler for such noises. In such assemblies, it is also desirable that shimmy of the wheels be eliminated and the metal-to-plastic faces 21 and 28 of the stud provide a clutching effect which will eliminate such wheel shimmy.

The tension-loaded joint 10 of FIGS. 1 and 4 is especially useful as an upper or non-load carrying joint for wheel suspensions.

The principles of this invention are equally applicable to the load carrying joints of wheel suspensions, and in FIG. 2, the reference numeral 50 designates a joint. This joint includes a housing 51 which may be a forging. The housing 51 has an open bottom generally hemispherical cavity 52 closed by an apertured cup 53 which is secured in the open end thereof. A stamped steel liner in the form of an apertured segmental spherical cup 54 is fitted in the cavity 52 to provide an internal spherical bearing wall. The bottom end of the cup 54 has an out-turned lip 55 seated in a cylindrical counterbore 56 in the bottom of the cavity 52. The cup 53 is held in the housing 51 by a spun-over lip 57 underlying a flange on the cup and holding this flange against the shoulder 58 provided by a counterbore in the end of the cavity.

The joint 50 includes a stud 60 with a shank 61 projecting freely through the cup 53 and with a head 62 retained by the cup 53 in tiltable relation. The head 62 has a flat top wall or shoulder 63 extending radially inward from the large end of the head 62 to a cylindrical upstanding shank 64. A bearing ring or bushing assembly 65 of the same type as the assembly 24 of FIGS. 1 and 3 has a central bore or aperture 66 therethrough receiving the shank 64 and an end face 67 receiving the shoulder 63 of the stud head 62. A shoulder 68 on the plastic bushing bottoms the metal cup or cover 69 and an annular flange 68a on the other end of the nylon bushing projects through the aperture in this cover 69 to cooperate with the shoulder 68 and hold the cover in fixed position on the nylon bushing. The metal cover 69 has spiral grease grooves 70 therearound and the nylon bearing has axially extending grease grooves 71 through the bore 66 thereof mating with radial grease grooves 72 in the end face 67 thereof.

In operation, of course, the stud 60 is compression loaded to move the spherical surface 73 of the stud head 62 off of the cup 53. Axial loads are carried on the metal-to-plastic surfaces 72 and 63. Radial loads are carried on the metal-to-plastic surfaces 64 and 66, and tilting loads are carried on the metal-to-metal bearing surfaces afforded by the cap 69 and liner 54. The stud is thus free to rotate in and on the nylon portion of the metal-clad bearing ring while all tilting actions are accommodated on the metal cover of the bearing ring. The top of the housing 51 is apertured to receive a grease fitting (not shown) and lubricant can thus be packed into the housing to be distributed through the grooves to the respective bearing surfaces.

The compression-loaded joint 50, like the tension-loaded joint 10, can be equipped with an inexpensive stud that is upset from rod stock and not subjected to expensive hardening or machining operations because the self-lubricating nylon on which the stud operates will protect the stud from wear. The joint 50, like the joint 10, is free from objectionable cold flow of the plastic bearing because the metal cover protects the bearing against such cold flow. The plastic bearing will dampen out the road noises and the coacting clutch faces 63 and 67 will minimize wheel shimmy.

From the above descriptions, it is, therefore, to be understood that this invention now provides an efficient, economical, silent operating, self-lubricating plastic equipped ball and socket joint which is free from objections heretofore encountered in plastic bushed joints.

I claim as my invention:

A ball and socket joint comprising,
  a housing having an apertured segmental spherical cavity, said housing having a bearing surface in said cavity forming a segmental spherical bearing cup,
  a metal clad bearing ring made of plastic material, said bearing ring comprising a metal cover having bearing engagement with said bearing cup and
  a main body portion disposed radially inwardly of and enclosed by said metal cover and having a straight cylindrical bore formed therein, said main body portion having a flat annular end face portion projecting axially beyond said metal cover,
  a stud having a cylindrical shank extending into said cylindrical bore, said stud having a portion thereof offset radially outwardly and forming a thrust face for engaging said end face portion, said end face portion and said bore having intersecting transverse and axial grooves, respectively, said metal cover having spiral grooves formed in the outer surface thereof, said end face portion having a lip overlying the end of said metal cover but spaced sufficiently inwardly of said bearing surface of said housing to afford communication of said spiral and transverse grooves with lubricant in the interior of said housing, whereby lubricant will be distributed through said grooves to all relatively movable surfaces.

References Cited in the file of this patent

UNITED STATES PATENTS

| | | |
|---|---|---|
| 2,701,151 | Booth | Feb. 1, 1955 |
| 2,751,676 | Kaul | June 26, 1956 |
| 2,755,116 | Alldredge | July 17, 1956 |
| 2,789,344 | Kaul | Apr. 23, 1957 |
| 2,807,486 | Bixby | Sept. 24, 1957 |
| 2,809,855 | Booth | Oct. 15, 1957 |
| 2,823,055 | Booth | Feb. 11, 1958 |
| 2,857,190 | Moskovitz | Oct. 21, 1958 |
| 2,971,787 | Lincoln | Feb. 14, 1961 |

FOREIGN PATENTS

| | | |
|---|---|---|
| 1,153,468 | France | Oct. 7, 1957 |